United States Patent [19]

Walch et al.

[11] 4,229,291
[45] Oct. 21, 1980

[54] PERMSELECTIVE MEMBRANE AND USE

[75] Inventors: Axel Walch, Frankfurt; Jürgen Wildhardt, Wallrabenstein; Dieter Beissel, Wiesbaden, all of Fed. Rep. of Germany

[73] Assignee: Hoechst Aktiengesellschaft, Frankfurt am Main, Fed. Rep. of Germany

[21] Appl. No.: 962,269

[22] Filed: Nov. 20, 1978

[30] Foreign Application Priority Data

Nov. 21, 1977 [DE] Fed. Rep. of Germany ....... 2751910

[51] Int. Cl.$^2$ ............................................. B01D 13/00
[52] U.S. Cl. ............................. 210/23 F; 210/500 M; 521/64; 521/185
[58] Field of Search ................. 210/500 M, 22, 321 R, 210/23 F; 55/16, 158; 521/38, 143

[56] References Cited

U.S. PATENT DOCUMENTS

| | | | |
|---|---|---|---|
| 3,228,876 | 1/1966 | Mahon | 210/22 |
| 3,567,632 | 3/1971 | Richter et al. | 210/500 M |
| 3,615,024 | 10/1971 | Michaels | 210/490 |
| 3,619,424 | 11/1971 | Blanchard et al. | 210/23 H |
| 3,923,664 | 12/1975 | Grover et al. | 210/321 R |
| 3,935,172 | 1/1976 | Vogel et al. | 210/500 M |
| 4,002,563 | 1/1977 | Vogl et al. | 210/23 H |

FOREIGN PATENT DOCUMENTS

| | | |
|---|---|---|
| 1794191 | 4/1974 | Fed. Rep. of Germany . |
| 2236226 | 7/1974 | Fed. Rep. of Germany . |
| 2602493 | of 1976 | Fed. Rep. of Germany . |
| 2606244 | 2/1976 | Fed. Rep. of Germany . |
| 1506785 | 4/1978 | United Kingdom . |

OTHER PUBLICATIONS

N. K. Man, Med. Klin. 71 (1976), pp. 1279–1287, (Nr 32/33).
"Kunststoffe", vol. 64, pp. 365–371 (1974).

*Primary Examiner*—Charles N. Hart
*Assistant Examiner*—E. Rollins Cross
*Attorney, Agent, or Firm*—Schwartz, Jeffery, Schwaab, Mack, Blumenthal & Koch

[57] ABSTRACT

Disclosed is a specific polyamide membrane suitable for hemofiltration, comprising a permselective asymmetric membrane of heteroporous structure comprising a polyamide which comprises a plurality of recurring terephthaloyldiamine units. The membrane has an ultrafiltration capacity of from about $1.5 \text{ sm } 10^{-3}$ to about $15 \cdot 10^{-3}$ cm/s·bar, determined for water at 0.1 bar and 20° C., a thickness of not more than about 100 microns, and a molecular weight exclusion limit of from about 20,000 to about 70,000 Dalton. The membrane is produced in a process which comprises introducing a solution of the polyamide in a water-miscible organic solvent into an aqueous precipitating liquid to obtain a coagulated membrane sheet, which is subsequently washed and dried.

9 Claims, 5 Drawing Figures

PERMSELECTIVE MEMBRANE AND USE

BACKGROUND OF THE INVENTION

This invention relates to a permselective asymetric membrane suitable for hemofiltration comprised of a specific polyamide and to its use in the hemofiltration process and apparatus for carrying out hemofiltration.

Hemofiltration is a known process for detoxifying blood, i.e. for removing toxic metabolites, even those present in a low concentration, and excess water.

Metabolites are those components of the living cell, which control the normal course of metabolic reactions, as well as products of metabolism formed or catabolized in human or animal organisms, such as urea, proteins, carbohydrates, and electrolytes, e.g., sodium or potassium salts.

Asymmetric membranes normally have a total thickness ranging from 100 to 500 microns. Their structure is made up of a relatively thick, highly porous backing with an extremely thin skin of a thickness of 0.1 to 5 microns on the upper surface thereof. This skin is the actual permselective membrane, whereas the coarse, highly porous backing merely serves to support the skin and, in itself, has no selective properties, and does not offer any marked hydrodynamic resistance to the filtrate flow.

Polyamide-based membranes of this kind are known, and are used as desalting membranes for reverse-osmosis processes. In these dissolving-diffusing asymmetric membranes which are considered as having a compact skin, transport is effected through a dissolving process in the membrane, followed by a diffusion step. Separation, therefore, depends on the solubility in the membrane of the components of the solution to be treated. These polyamide membranes are described, for example, in German Offenlegungsschriften Nos. 19 41 022, 19 49 847, 23 08 197, 24 01 428, and 24 25 563. They are not suitable for hemofiltration, particularly on account of their molecular weight exclusion limits, their ultrafiltration capacities and the additives which are contained therein.

Contrary to the above-described membranes, membranes which are suitable for carrying out hemofiltration must be porous membranes, wherein the molecular weight exclusion limit of the membrane is determined by its pore-diameter. Only substances having molecules of a size smaller than the pore-size of a respective membrane are able to quantitatively pass through such a membrane. Up to the respective molecule size all metabolites, irrespective of their molecular weight, are thus completely removed in a similar ratio of concentration as in blood.

In hemofiltration an adjustable pressure-gradient serves as the driving force. Owing to a pressure-gradient existing at the membrane and to the resulting convective flow, toxic metabolites and excess water are faster eliminated from the blood and carried off than would be possible by means of the conventional hemodialysis. This convective flow, however, requires membranes which have a relatively stable pore-structure resembling continuous capillaries and are only slightly compressible when subjected to pressure. These stationary pores or capillaries offer a lower transport-resistance to convective flows than a gel-like homogenous pore-structure. Membranes having a stable pore-structure are also called macroporous or heteroporous membranes.

Conventional ultrafiltration membranes, on the other hand, as described in German Offenlegungsschrift No. 17 94 191 exhibit some of the properties which are valid for hemofiltration (e.g. molecular weight exclusion limit). However, an application for hemofiltration in a broad clinical range demands a spectrum of further preconditions.

Hemofiltration has various advantages over hemodialysis; for example, the time which is required for treatment of a person suffering from chronic kidney diseases is reduced, toxic metabolites are removed even if they are present only in minimal concentrations, and alleviation of specific symptoms, e.g., hypertension is achieved. However, the process has, nevertheless, not yet been generally accepted, since the membranes which are known so far do not comply with all requirements.

The mode of operation of hemofiltration makes great demands on the membranes, because, contrary to hemodialysis,, a pressure of up to about 0.9 bar is exerted upon the membrane. In order to ensure sufficient operational safety and easy insertion in the hemofiltration-apparatus, the membrane must have high flexibility and strength, even in the absence of an additional reinforcement which may be incorporated in the membrane or of a supporting backing. A reinforcement, as it is incorporated in conventional membrane materials, usually has the disadvantage that the effective membrane-surface is reduced and the occurrence of pin-holes is enhanced. A supporting backing, on the other hand, leads to a membrane which is too thick and inflexible. It must also be taken into account that any reinforcement or support of the membrane would cause additional expenses for material and would necessitate additional process-steps in the manufacture of the membrane. Due to requirements concerning the apparatus, therefore a self-supporting membrane is particularly advantageous. Furthermore, its wet-thickness in an aqueous solution and in blood, should be below 100 microns due to the particular condition in hemofiltration apparatuses. Only in this case an optimum blood-flow pattern and the necessary compactness of the apparatus are ensured in the hemofiltration apparatus. However, reduction of the wet-thickness to values below 100 microns leads to formation of microholes in most of the membranes, and in self-supporting membranes it will result in insufficient strength. Furthermore, this reduction usually has an adverse or at least unpredictable effect on the ultrafiltration-capacity and the molecular weight exclusion limit and other properties.

The ultrafiltration-capacity values and the molecular weight exclusion limit values of the membrane determined for water and for blood must be within particular limits, and the values obtained for blood should be comparable to those obtained for water. If the ultrafiltration-capacity for water is too low, or if it shows a marked drop when blood is used instead of water, this leads to the disadvantage that either an excessively large membrane surface must be employed for a sufficiently fast removal of water or the period of treatment has to be relatively long. If the ultrafiltration-capacity is too high, water is too quickly eliminated, which leads to problems regarding the supply of metabolites from cell-compartments and to symptoms of disequilibrium, and must be compensated for by expensive adjustment-procedures. Furthermore, the ultrafiltration-capacity is, within certain limits, related to the molecular weight exclusion limit.

The molecular weight exclusion limit should, if possible, be within a range wherein, on the one hand, even smaller macro-molecular metabolites can be removed and, on the other hand, the losses of larger vital proteins, particularly serum albumin, are kept low. For producing an optimum membrane, it is important that, for reasons of purity, the number of components is kept as low as possible and that the components are miscible with water and are, at least in traces, non-toxic. Furthermore, this would substantially facilitate the manufacturing process.

As far as possible the membrane must be free from toxic residues, or it must be possible to eliminate any toxic residues in a simple manner, without thereby causing a marked physical or chemical modification of the membrane. In particular, it must be possible to quantitatively remove the solvents, precipitating agents and purifying agents which are used in the manufacture of the membrane.

Another requirement which must be met by the membrane-forming polymer is a relatively low absorption of water; a slightly hydrated polymer forms the stable pore-structure resembling continuous stationary capillaries which is needed in the membrane. Only in this case can the dry membrane easily be handled when it is processed and inserted into the respective hemofiltration apparatus, and any compression or modification of the membrane under hemofiltration conditions is diminished.

A polymer of this kind would be particularly advantageous for the maufacture of non-shrinking membranes which may be stored in the dry state and which may be easily inserted as hemofilters into a hemofiltration apparatus and may be sterilized in the dry state.

A membrane which is optimally suitable for hemofiltration must, therefore, exhibit a high degree of flexibility and strength in the dry and in the wet state in order that it can be safely processed and inserted into the hemofiltration apparatus and also in order to guarantee operational safety. Furthermore, a membrane made of a thermoplastic material would have the advantage of being weldable, which could result in a simpler processing. Above all, a membrane of this kind must be free of pin-holes, it must readily be producible in a continuous manufacture on a commercial scale, and it must be easily processable in order that hemofiltration can be clinically used.

None of the membranes hitherto known has all of these favorable properties.

For example, cellulose acetate (see, e.g., NTIS Report PB-22 50 69) or polyacrylonitrile (German Auslegeschrift No. 21 45 183), when used as base materials of membranes for the "artificial kidney", exhibit an undesirably high absorption of water and the disadvantage connected therewith. They require, e.g., a very high content of plasticizers, in order to be storable in the dry state, and, in particular, they have poor handling properties and a low mechanical strength. Although membranes made of a polysulfone (German Auslegeschrift No. 22 28 537) or an aromatic polyamide or polyimide (German Auslegeschrift No. 23 42 072) or of cellulose triacetate ("Biotechnische Umschau" 1 (9), 280 1977) show a reduced absorption of water, they nevertheless present problems regarding reproducibility, handling properties, flexibility, resistance to tear-propagation, elongation, and pin-holes, particularly in the dry state at membrane-thicknesses below 100 microns. Furthermore, the conventional membranes are often manufactured using additives which can be removed only with difficulty. In total, these problems hamper an economic production of hemofiltration apparatus, especially in the case of flat sheet membranes. Finally, membranes made of the above-mentioned polymers show an undesired affinity for blood-constituents and a high absorption of proteins, whereby permeation properties and blood-compatibility are impaired.

SUMMARY OF THE INVENTION

It is an object of the present invention to provide a permselective membrane suitable for hemofiltration which fulfills the above-mentioned requirements and avoids the drawbacks of the above-described prior art membranes.

It is a further object of the present invention to provide an asymmetric hemofiltration membrane comprised of a specific polyamide and having a heteroporous structure.

It is a further object of the present invention to provide a hemofiltration apparatus comprising an asymmetric hemofiltration membrane comprised of a specific polyamide and having a heteroporous structure.

In order to accomplish the foregoing objects according to the present invention there is provided a permselective asymmetric membrane suitable for hemofiltration, comprised of a specific polyamide and having a heteroporous structure. The specific polyamide comprises a plurality of repeating terephthaloyldiamine units of the formula

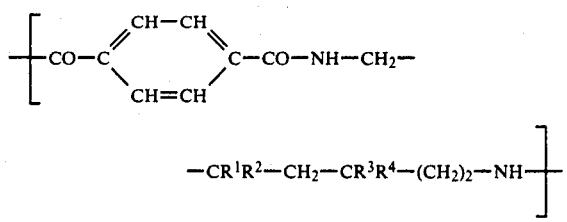

wherein $R^1$ represents hydrogen and $R^2$, $R^3$, and $R^4$ represent lower alkyl, or $R^3$ represents hydrogen and $R^1$, $R^2$, and $R^4$ represent lower alkyl, having an ultrafiltration-capacity of from about $1.5 \cdot 10^{-3}$ to about $15 \cdot 10^{-3}$ cm/s·bar measured for water at a pressure of 0.1 bar and a temperature of 20° C., a thickness of not more than 100 microns, and a molecular weight exclusion limit of from about 20,000 to about 70,000 Dalton.

The lower alkyl preferably is methyl or ethyl.

According to the present invention, there is further provided a process for preparing the above-defined membrane suitable for hemofiltration which comprises the steps of (a) preparing a solution comprising from about 10 to about 25% by weight of a polyamide which comprises repeating terephthaloyldiamine units of the formula

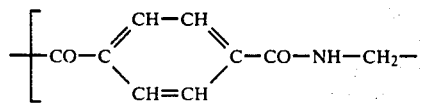

-continued

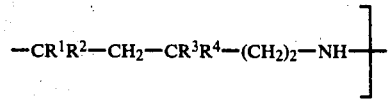

wherein $R^1$ represents hydrogen and $R^2$, $R^3$, and $R^4$ represent lower alkyl, or $R^3$ represents hydrogen and $R^1$, $R^2$, and $R^4$ represent lower alkyl, dissolved in at least one water-miscible organic solvent and having a viscosity of from about 500 to about 50,000 cp at 20° C.;

(b) introducing a liquid layer of said solution into an aqueous precipitating liquid at a temperature not exceeding 80° C. whereby part of the water-miscible organic solvent is removed from the liquid layer and the liquid layer is coagulated into an asymmetric heteroporous membrane-sheet;

(c) washing the coagulated membrane with an aqueous washing-liquid; and (d) drying the washed membrane.

The membrane may be produced in the form of a flat sheet or a tube.

According to a preferred embodiment of the process the membrane is produced in the form of a flat sheet. In this case, the process step (b) comprises the steps of applying a liquid layer of the polyamide solution onto a support and passing the support carrying the liquid layer through the precipitating liquid whereby the asymmetric heteroporous membrane is coagulated on the support. Preferably a layer of the polyamide solution is continuously applied onto the upper side of the support in a liquid application-unit of an apparatus for carrying out the present method for manufacturing membranes, whereby the support is continuously moved from the liquid-application-unit to a precipitating unit containing the precipitating liquid in such a manner that a coated portion of the support is continuously introduced into and passed through the precipitating liquid.

In accordance with yet another aspect of the present invention, there has been provided an improvement in a hemofiltration-process and an apparatus for performing hemofiltration, including a hemofiltration-membrane, means for transporting blood into contact with a first side of the membrane and means for withdrawing metabolites from a second side of the membrane. The improvement comprises using for the hemofiltration membrane the membrane as defined above.

Other objects, features, and advantages of the present invention will become apparent from the detailed description of preferred embodiments which follows, when considered in light of the attached figures of drawings.

DETAILED DESCRIPTION OF THE INVENTION AND ITS PREFERRED EMBODIMENTS

Figure 1:
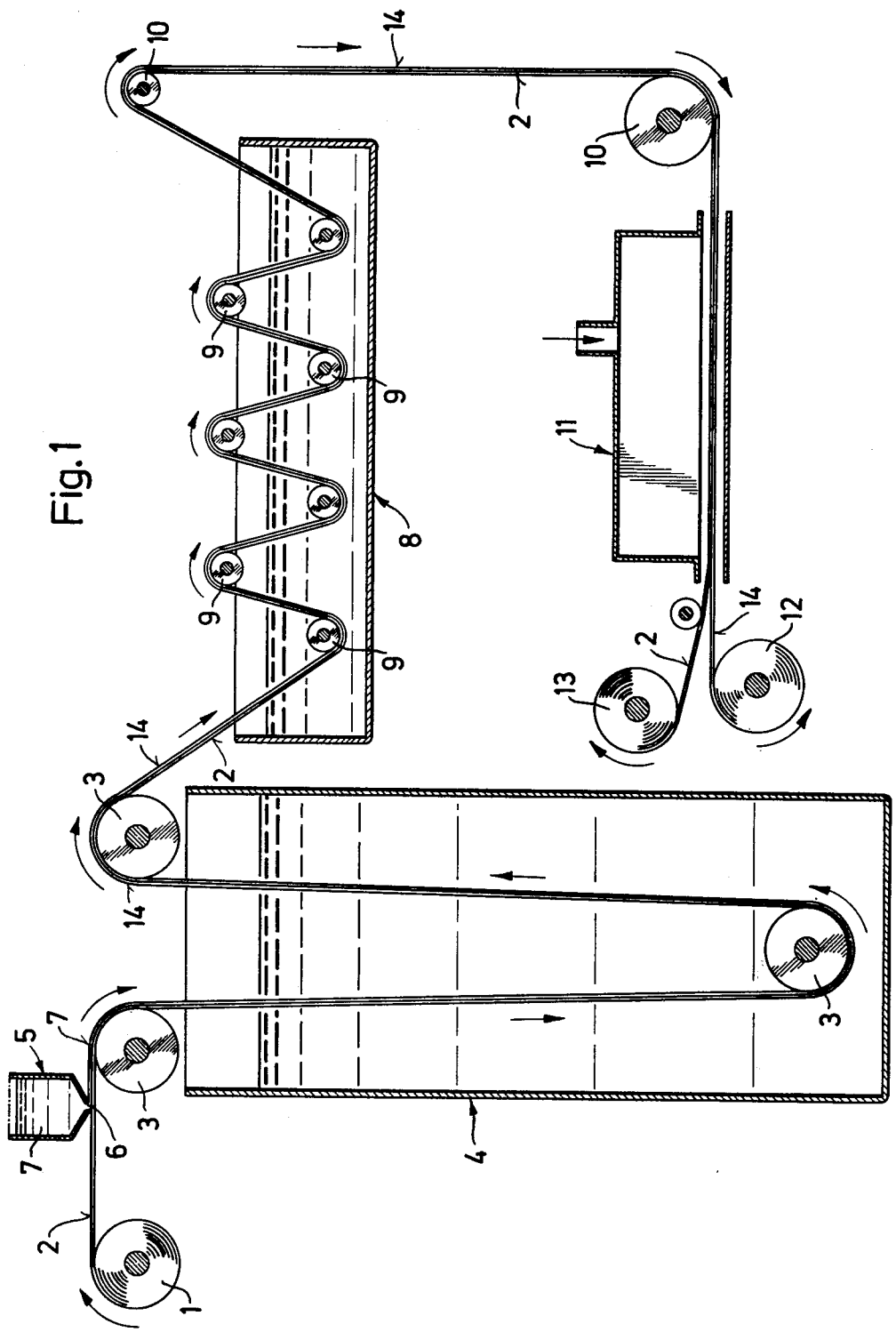
FIG. 1 illustrates schematically an embodiment of the apparatus for carrying out an embodiment of the method according to the present invention wherein the membrane is removed from its support after drying.

Surprisingly it has been found that a permselective membrane comprised of polyamide and having the above-defined composition and properties, exhibits all the properties which are required of a hemofiltration membrane.

The membrane-forming polymer according to the invention is, particularly, a polycondensate from terephthalic acid and an isomer mixture in the ratio of 1:1 of 2,2,4- and 2,4,4-trimethyl-hexamethylenediamine. This polyamide is, for example, described in "Kunststoffe", 56, 542 (1966) the disclosure of which is hereby incorporated by reference.

The membrane is asymmetric and self-supporting. Depending on the particulars of the hemofiltration apparatus, the membranes may be in the form of a flat sheet or a tube. For example, in the case that tubular membranes are used these may also be combined with a supporting backing or may comprise a reinforcing fabric, non-woven or net incorporated therein. The membranes in the form of a flat web usually have a thickness of from about 20 preferably about 30 to about 100 microns and exhibit in the wet and in the dry state a high degree of strength, flexibility and flawlessness, at a thickness of 100 microns or less, and even at thickness-values which are as low as 30 microns. The membrane may, however, also be in the form of a self-supporting hollow tube, e.g., a capillary or hollow fiber, preferably having a wall-thickness of from about 20 to about 80 microns.

The bursting-pressure of non-reinforced flat membranes determined at 20° C. using a bursting-pressure tester (No. 820, type Schopper, manufactured by K. Frank GmbH, Mannheim, Germany) is from about 0.18 to about 0.52 bar in the wet and in the dry state, the elongation at break ranges from about 60 to about 120% (determined according to the German industrial standard method DIN 53 455, using a distance between clamping points of 50 mm, testing speed 50 mm/min), and the resistance to tear-propagation ranges from about 20 to about 50 N/mm (determined according to German industrial standard method DIN 53 363).

In the dry state, the membrane may, e.g., be welded using a welding-apparatus, using a welding-temperature of from about 190° to about 250° C.

The ultrafiltration-capacity for the ultrafiltration of water is determined on the previously dried and then re-wetted membrane in a cylindrical agitator-cell (500 revolutions per minute, volume 350 ml) at a membrane-surface of 43 cm$^2$, a transmembrane-pressure of 0.1 bar, and a temperature of 20° C. The resulting ultrafiltration-capacity values, i.e. amount of filtrate (cm$^3$) per unit of time (s), pressure (bar), and membrane-surface (cm$^2$), range from about $1.5 \cdot 10^{-3}$ to about $15 \cdot 10^{-3}$ cm/s·bar (20° C.). the ultrafiltration-capacity values determined with bovine blood are reduced by a factor not exceeding 6, preferably not exceeding 3, as compared to the value determined for water.

The rejection-capacity, e.g., for Dextran 70,000 (manufactured by Pharmacia, Uppsala, Sweden) is determined in a cylindrical agitator-cell (500 revolutions per minute, volume 350 ml). The membrane-surface is 43 cm$^3$, the pressure 0.1 bar, and the temperature 20° C. The rejection capacity R is defined as follows:

$$R = \frac{C_1 - C_2}{C_1} \cdot 100\%$$

$C_1$ is the concentration of the solution of Dextran 70,000 in water, corresponding to 1 percent by weight, and $C_2$ is the concentration of Dextran 70,000 in the filtrate. Rejection-capacity values for Dextran 70,000 as determined by this method preferably are from about 20 to about 90%. The values for the rejection-capacity R which are found for Dextran 70,000 are comparable to the values determined for cytochrome-c. The molecular weight exclusion limit is from about 20,000 to about 70,000 Dalton. These measurements are carried out for various proteins having defined molecular weights, using the above-described agitator-cell, for example, for 0.1 percent by weight of cytochrome-c, trypsin, pepsin, albumins, and globulins.

The reproducibility of the ultrafiltration-capacity per charge is about ±10%, and the reproducibility of the molecular weight exclusion limit is about ±6,000 Dalton.

The chemical purity of the membrane corresponds to the Standard for Blood Bags according to DIN 58 361. The membrane does not show any toxicity or hemolysis, as evaluated according to the German industrial standard method DIN 58 372.

In order to prepare membranes in the form of a flat sheet, the polyamide-containing solution which has a viscosity ranging from about 500 to about 50,000 cp (20° C.) is applied to a support having a surface which is as smooth as possible, and preferably at least the coating side of the support is comprised of a synthetic polymer material. The support is, in particular, a polyethylene film, a siliconized paper or a plastic non-woven material. It is, however, also possible to use a metal band, e.g., an endless belt, or a metal drum as support, which is, e.g., made of polished high-grade steel. The organic solvent is composed of one or several organic liquids which are miscible with water, for example, N,N-di-lower-alkylamides of lower carboxylic acids such as dimethyl-acetamide, lower alkyl alcohols containing 1–3 hydroxy groups such as ethanol, glycerol, lower alkyl ketones, such as acetone, or preferably the relatively non-toxic dimethyl sulfoxide. Advantageously the solution comprises between about 10 and about 25% by weight of the above-specified polyamide. If appropriate, the solution may additionally contain an amount of less than 10 percent by weight of one or several salts which are capable of forming hydrogen bonds. These salts are salts of alkaline metals or alkaline earth metals with mineral acids, for example, magnesium and lithium halogenide or magnesium and lithium nitrate. Such salts are conventionally used in known processes for the manufacture of conventional membranes. However, according to a preferred embodiment of the method according to the present invention, the membrane is preferably manufactured from a polyamide solution which has a viscosity ranging from about 500 to about 10,000 cp (20° C.), and is substantially free of any hydrogen-bond-forming salts.

The solution can be continuously applied to the support which advantageously is moving at a constant speed, by passing it through a slot-opening of a casting device or by distributing it on the support by means of a wiper.

Most preferably, the solution which is applied to the support comprises from about 15 to about 20 percent by weight of polyamide, in a solvent comprising from about 60 to about 100 percent by weight of dimethyl sulfoxide. The thickness of the wet layer of the solution which is applied to the support, can be varied, depending, inter alia, on the size of the opening through which it is passed onto the support, e.g., on the slot-width of the casting device or on the distance between the wiper and the support, that is the height of the gap formed between the latter two. Suitably the thickness may vary between about 50 and about 400 microns.

The support is coated, for example, under dust-free conditions, e.g., in a chamber in which a laminar air-flow is produced, at a relatively humidity of above 40% and a constant temperature, particularly a temperature of from about 20° to about 50° C. Coagulation is effected, if appropriate following a short stay in air, by introducing the layer of solution on the support into a precipitating bath comprising water or an aqueous solution at a temperature not exceeding 80° C., preferably a temperature of between about 10° and about 80° C. It is also possible to coat the support directly in the water or the aqueous solution at temperatures not exceeding 80° C., e.g., by means of applying the solution through a nozzle onto the support which is situated in the precipitating bath. If required, the resulting coagulated membrane is removed from the support in an additional process-step. This procedure may be carried out after coagulation or following one of the ensuing process-steps by lifting or peeling the membrane off.

After coagulation the membrane is, at a temperature not exceeding 80° C., e.g., a temperature of between about 10° and about 80° C., freed from the adhering mixture of solvent and precipitant. For this purpose, the membrane is, for example, treated with water or with an aqueous solution, whereby the solvent for the polyamide is almost completely removed.

If appropriate, the membrane is treated with a plasticizer, following coating of the support and prior to drying. For this purpose, an aqueous solution is, e.g., used, containing not more than 50 percent by weight of the plasticizer, e.g., a polyvalent aliphatic alcohol containing 2–4 carbon atoms, preferably glycerol. The temperature of the plasticizer solution is from about 20° to about 80° C.; this process-step is carried out according to the method described in German Offenlegungsschrift 24 56 174 or in U.S. Pat. No. 3,957,935, the disclosure of which is hereby incorporated by reference. Subsequently, the membrane is dried at a temperature not exceeding 80° C. using, for example, a hot-air blower. The temperature of the hot air supplied may exceed 80° C., as long as the membrane is not heated to a temperature exceeding 80° C. In lieu of providing a separate plasticizer-bath, the plasticizer may be contained in the water-bath or in the aqueous solution of the preceding washing-procedure. Finally, the membrane is cut to the desired width and/or length. In a modification of the process the membrane is not removed from the support, but is rolled up together with the support upon completion of the process.

Further modifications of the process consist in removing the membrane from the support only after the washing procedure, following treatment in the plasticizer-bath, or after the drying procedure; in these cases the support is either continuous or comprises a web which is rolled-up after the membrane has been removed.

The process according to the invention is now explained by reference to the following examples in connection with the process diagrams represented in FIGS. 1 to 4, without limiting it to the examples and drawings. In the FIGS. 1 to 4, elements having identical functions are denoted by the same reference numerals.

EXAMPLE 1

Figure 3:
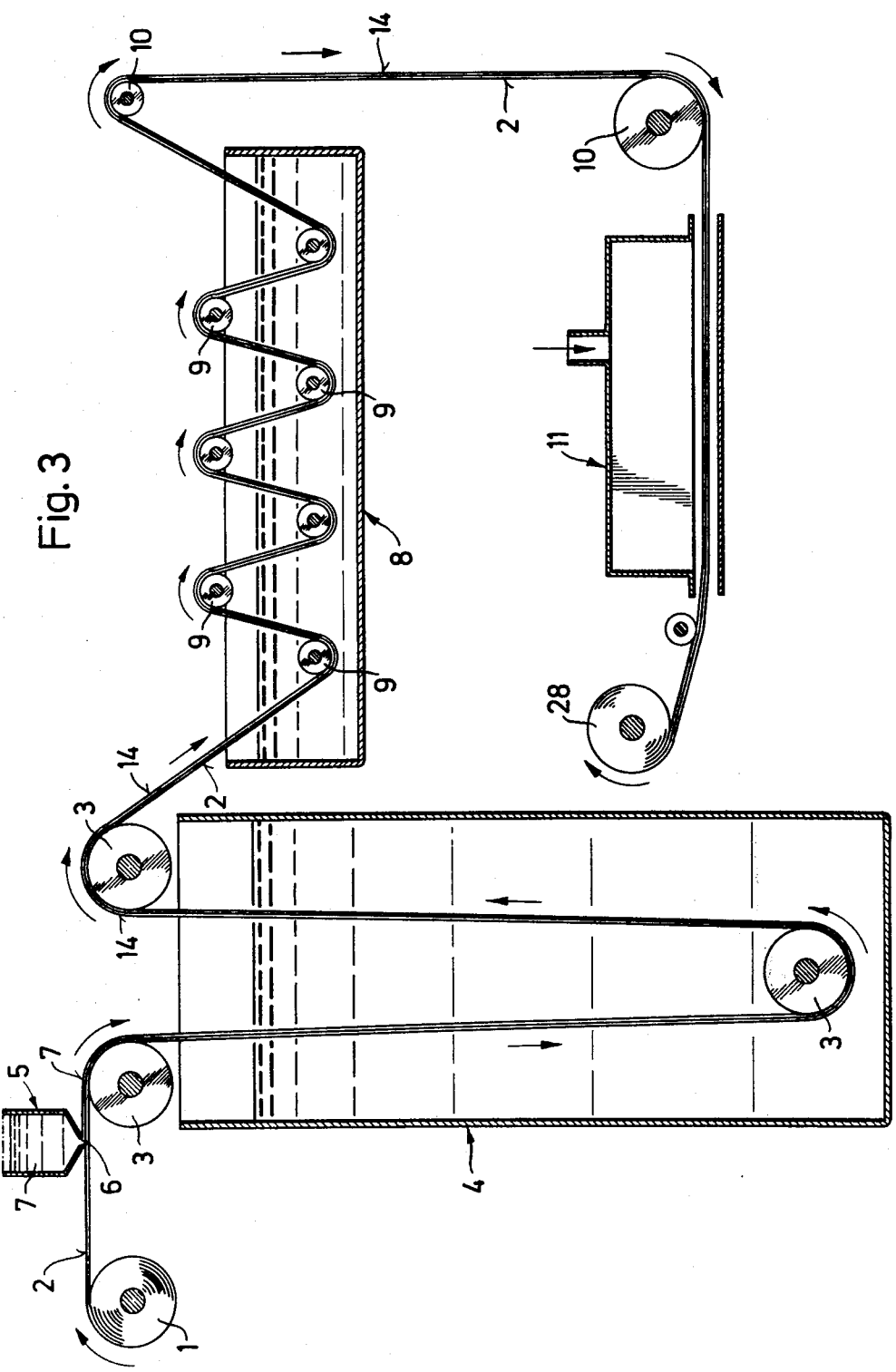
FIG. 3 illustrates schematically another embodiment of the apparatus for carrying out the embodiment of the method according to the present invention wherein the membrane is removed from its support after drying.

18 weight percent of a polyamide prepared by polycondensation from 2,2,4- and 2,2,4-trimethyl-hexamethylenediamine (ratio 1:1) and terephthalic acid, having a density of 1.12 g/cm$^3$ (DIN 53 479) and a water-absorption of 40 mg (DIN 53 472) are dissolved in 82 weight percent of pure dimethyl sulfoxide at 60° C. within a period of 15 hours in an agitator vessel. The solution is then cooled down to room temperature. The solution has a viscosity of 3,300 cp at 20° C. As shown in FIG. 3, the solution 7 is poured at a pressure of 1.5 bar from a casting-device 5 having a slot 6 (width of slot 300 microns) onto a web-shaped non-woven polyester fabric 2, which has a thickness of 30 microns and is taken from a roll 1 and conveyed via rolls 3 into a precipitating bath 4 where it is deviated. Application of the solution onto the support is carried out under dust-free conditions in a laminar air-flow at 70% relative humidity and a constant temperature of 30° C. The coated web-shaped non-woven fabric 2 is transported at a speed of 7 m/min into the precipitating bath 4 containing water at 20° C., wherein coagulation of the polyamide takes place. Via deviating rollers 9 the web-shaped non-woven fabric 2, together with the membrane 14, coagulated thereon, is passed through a washing-device 8 containing a mixture of water and 30 percent by weight of glycerol at 70° C.; it is then led via rollers 10 to the dryer 11 where the membrane 14 is dried at a temperature of from about 60° to about 80° C. Upon leaving the dryer 11 the membrane 14 is wound upon the roll 28 together with the supporting web 2, as shown in FIG. 3.

If required, the membrane is conveyed to a cutting station which is not shown.

The obtained membrane including the support has a thickness of 80 microns, an ultrafiltration-capacity of $5.7 \cdot 10^{-3}$ cm/s·bar for water and of $1.9 \cdot 10^{-3}$ cm/s·bar for bovine blood, a rejection-capacity R for Dextran 70,000 of 44%, and a molecular weight exclusion limit of 58,000±6,000 Dalton.

EXAMPLE 2

16 weight percent of the polyamide described in Example 1 are dissolved in 84 weight percent of pure dimethyl sulfoxide at 60° C. during 12 hours. Following cooling to room temperature (20° C.) the solution has a viscosity of 1,100 cp.

As shown in FIG. 1, the solution 7 is spread upon a web 2 of polyethylene film which is taken from the roll 1 and travels into a precipitating bath 4 via rolls 3. Instead of the casting-device 5, a coating-device comprising a wiping-knife, is used. The roll 1 and the coating-device are arranged in such a manner that application of the solution to the support is effected under water. The coated supporting web is passed through the precipitating bath containing water at 32° C. at a speed of 8 m/min, whereby coagulation of the polyamide takes place. Via deviating rollers 9 the supporting web, together with the membrane 14, is led through a washing-device 8 containing a mixture of water and 50 percent by weight of glycerol at 70° C. Subsequently, it is conveyed towards the dryer 11 via rollers 10, and there the membrane 14 is dried at a temperature of from about 50 to about 60° C. In this case, the roll 13 which is to take up the web 2 is arranged behind the dryer 11, so that the membrane 14 and the web 2 are separated only after drying. The membrane 14 is conveyed to a cutting-station which is not shown and is wound upon the roll 12. The membrane obtained has a thickness of 50 microns, an ultrafiltration-capacity of $6.1 \cdot 10^{-3}$ cm/s·bar for water and of $2.4 \cdot 10^{-3}$ cm/s·bar for bovine blood, a rejection-capacity R for Dextran 70,000 of 53%, and a molecular weight exclusion limit of 51,000±6,000 Dalton. In the dry and in the wet state the membrane shows an elongation at break of 96 to 105%, a resistance-to-tear-propagation of 27 to 29 N/mm and a busting-pressure of 0.20 to 0.22 bar.

EXAMPLE 3

Figure 4:
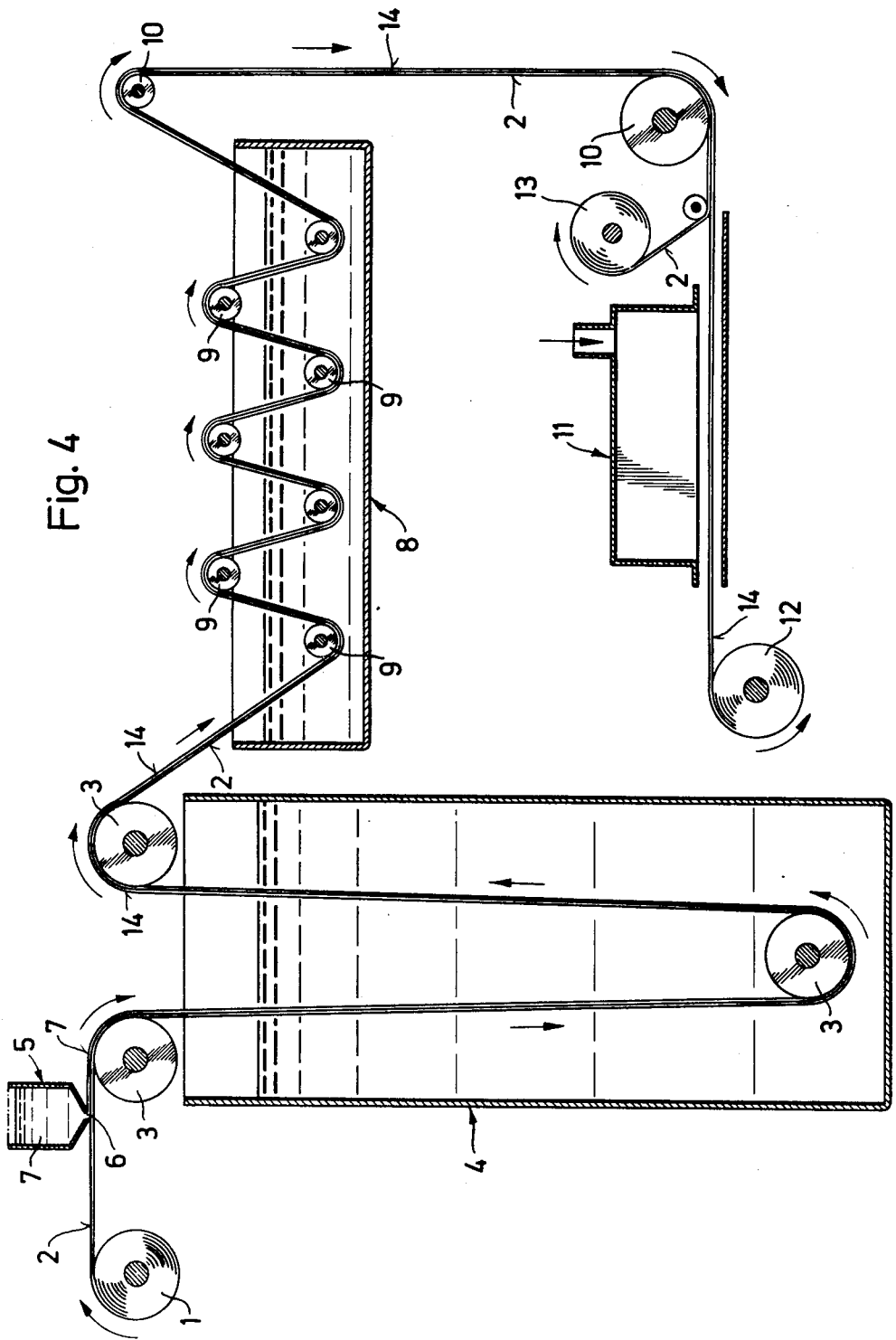
FIG. 4 illustrates schematically another embodiment of the apparatus for carrying out the embodiment of the method according to the present invention wherein the membrane is removed from its support after drying.

20 weight percent of the polyamide described in Example 1 are dissolved in 80 weight percent of pure dimethyl sulfoxide at 70° C. during 10 hours. Following cooling to room temperature (22° C.) the solution has a viscosity of 5,500 cp. As depicted in FIG. 4, the solution 7 is applied to a web-shaped siliconized paper 2 which is taken from the roll 1 and travels via rolls 3 into a precipitating bath 4 in which it is deviated. Instead of the casting-device 5 shown, a wiper-blade is employed. Application is carried out under dust-free conditions in a laminar air-flow at 60% relative humidity and a constant temperature of 25° C. The coated paper 2 is conveyed at a speed of 4 m/min into the precipitating bath 4 containing water at 35° C., where coagulation of the polyamide takes place. Via deviating rollers 9 the paper 2, together with the coagulated membrane 14, is led through a washing-device 8 containing a mixture of water and 40 percent by weight of glycerol at 60° C. Subsequently, it is transported via rollers 10 to the dryer 11, where the membrane 14 is dried at a temperature of from about 60° to about 70° C. In this case, the roll 13 which is to take up the paper 2 precedes the dryer 11, so that the membrane 14 is already separated from the paper 2 before it is dried. The membrane 14 is conveyed to a cutting-station which is not shown and is wound upon the roll 12.

The obtained membrane has a thickness of 70 microns, an ultrafiltration-capacity of $2.2 \cdot 10^{-3}$ cm/s·bar for water and of $1.5 \cdot 10^{-3}$ cm/s·bar for bovine blood, a rejection-capacity R for Dextran 70,000 of 58%, and a molecular weight exclusion limit of 47,000±6,000 Dalton. In the dry and in the wet state the membrane exhibits an elongation at break of 66 to 71%, a resistance-to-tear-propagation of 43 to 46 N/mm, and a bursting-pressure of 0.32 to 0.35 bar.

EXAMPLE 4

18 weight percent of the polyamide described in Example 1 are, at 20° C. and during 16 hours, dissolved in a mixture of 57 weight percent of dimethyl sulfoxide and 25 weight percent of acetone. The solution has a viscosity of 900 cp. As is shown in FIG. 1, the solution 7 is spread upon a web 2 of polyethylene film which is taken from a roll 1 and travels via rolls 3 into a precipitation bath 4, in which it is deviated. Instead of the casting-device 5 a wiper-blade is used for spreading the solution onto the support. The application is carried out under dust-free conditions in a laminar air-flow at 85% relative humidity and a constant temperature of 25° C. The coated supporting web 2 is conveyed at a speed of 6 m/min into the precipitating bath 4 containing water at 45° C., where coagulation of the polyamide takes place. Via deviating rollers 9 the supporting web, together with the membrane 14, is passed through a washing-device 8 containing a mixture of water and 30 percent by weight of glycerol at 70° C. It is, subsequently, conveyed via rollers 10 to the dryer 11, where the membrane 14 is dried at a temperature of from about 50° to about 60° C. In this case, the roll 13 which is to take up the web 2 is arranged behind the dryer 11, as shown in FIG. 1, so that the membrane 14 is separated from the web 2 only after drying. The membrane 14 is conveyed to a cutting-station which is not shown and is wound upon the roll 12.

The obtained membrane has a thickness of 60 microns, an ultrafiltration-capacity of $7.6 \cdot 10^{-3}$ cm/s·bar for water and of $2.7 \cdot 10^{-3}$ cm/s·bar for bovine blood, a rejection-capacity R for Dextran 70,000 of 75%, and a molecular weight exclusion limit of $33,000 \pm 6,000$ Dalton. In the dry and in the wet state the membrane exhibits an elongation at break of 78 to 89%, a resistance-to-tear-propagation of 30 to 41 N/mm, and a bursting-pressure of 0.25 to 0.28 bar.

EXAMPLE 5

Figure 2:
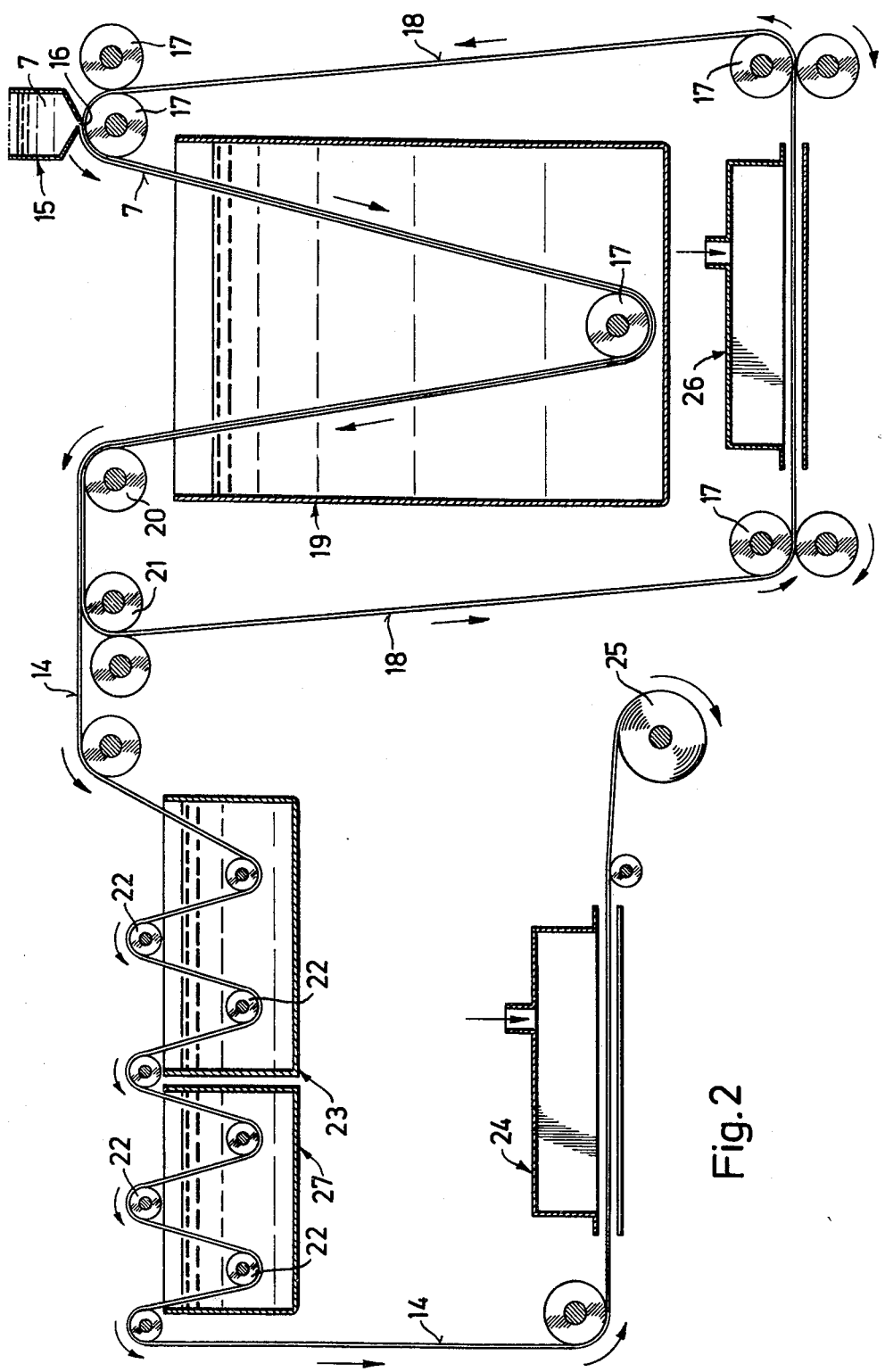
FIG. 2 illustrates schematically an apparatus for carrying out another embodiment of the method according to the present invention wherein the membrane is removed from its revolving support prior to passing through the washing zone.

As depicted in FIG. 2, a polyamide solution 7 is poured through the gap 16 of the casting-device 15 onto a highly polished high-grade steel belt 18 which runs around rolls 17. The coated belt 18 passes through the precipitating bath 19 which is filled with water acting as the precipitant. The membrane 14 is separated from the belt between the rolls 20 and 21 and is guided over rollers 22, first through the water-bath 23, where residual solvent is washed away with water, and then through the vessel 27 containing an aqueous glycerol solution. After the membrane has been treated with hot air at 80° C. in the dryer 24 it is wound upon the roll 25. The drying-chamber 26 serves to free the revolving belt 18 from adhering solvents and precipitants. In a modification of the process the belt 18 is, after removal of the membrane 14, guided through the precipitating bath 19 back to the gap 16 of the casting-device 15. In this case, the belt is freed from remaining traces of liquid, e.g., by means of strippers.

As compared with conventional membranes, the asymmetric membranes obtained in the process according to the present invention show in the wet and also in the dry state, at a thickness of less than 100 microns, a combination of excellent properties for hemofiltration. They are of a high strength and flexibility and free of pin-holes. They may be stored, inserted into the hemofiltration apparatus, and sterilized in the dry state. They are free from toxic residues, particularly if dimethyl sulfoxide is used as a solvent, since the solvent can readily be extracted therefrom using water or an aqueous solution at temperatures up to 80° C. The membranes have an excellent blood-compatibility, their protein-adsorption is less than 3 g/m², and the ratio between their permeation-properties for water and blood is satisfactory.

Due to the comparatively low protein-adsorption which is usually less than 3 g/m² in the ultrafiltration of blood at a transmembrane-pressure of 0.1 bar, the value of the ultrafiltration-capacity for blood, as compared to that for water, is only reduced by a factor not exceeding 6, preferably not exceeding 3. In a continuous commercial-state manufacture the obtained membranes exhibit a high degree of uniformity of properties, and they are weldable owing to the thermoplastic material used. The membrane-forming polymer has a low adsorption of water, so that a membrane having a stable pore-structure, i.e. a heteroporous structure, is obtained, instead of a gel-like membrane. Furthermore, there is the advantage that a loss of plasticizer does not give rise to an embrittlement or shrinkage of the membrane. It is sufficient to use only a relatively small proportion of the plasticizer which is advantageous for maintaining a high degree of permeability.

Further properties of this membrane have already been described above. The membrane is thus particularly suitable for use in apparatus for carrying out hemofiltration.

If the membrane is to be in the form of a hollow tube the following conventional procedure is applied:

A polyamide-containing solution having a viscosity of from about 20,000 to about 50,000 cp at 20° C. is extruded into a precipitating bath through a spinneret using a supporting gas, particularly, however, a supporting liquid which, simultaneously, has a coagulating effect, and the material is after-treated in an appropriate manner.

Figure 5:
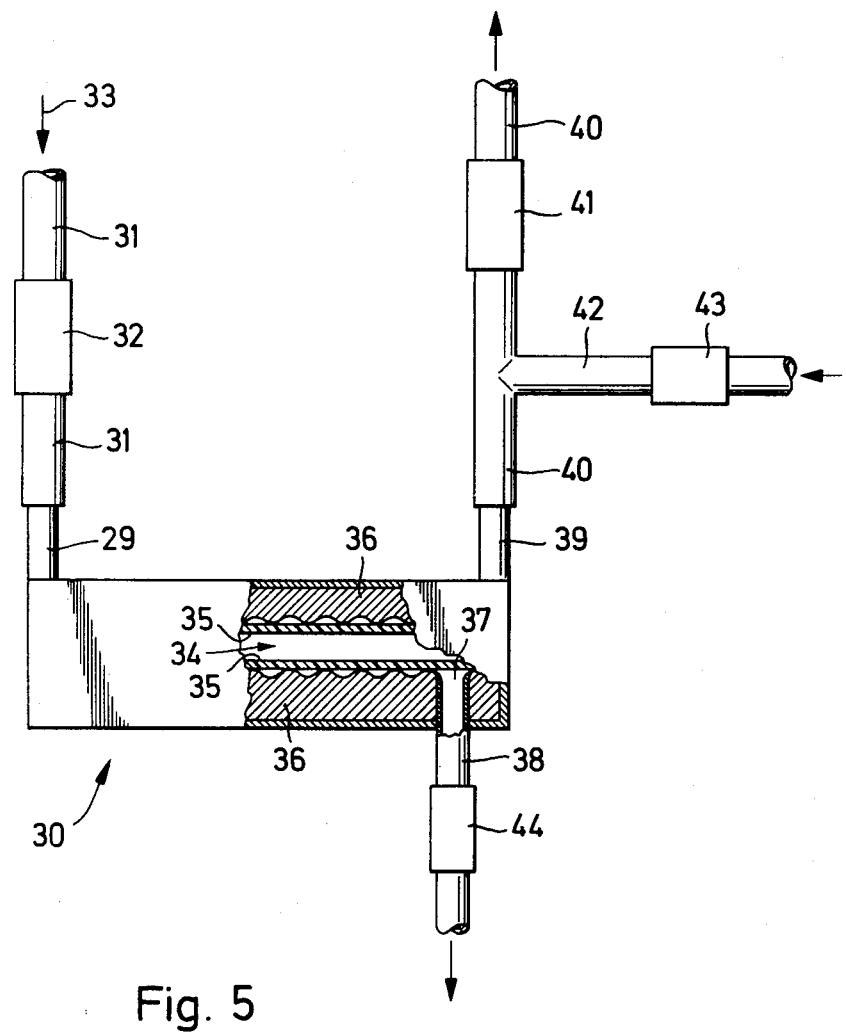
FIG. 5 is a diagrammatic representation showing a hemofiltration assembly with a single blood channel.

Referring now to FIG. 5, a hemofiltration assembly is shown with a single blood channel which illustrates the use of the polyamide membrane of the invention. An inlet port 29 of a hemofiltration apparatus 30 is connected via flexible tubing 31 to the patient's arterial access either directly or via a peristaltic blood pump adapted to rotate in the direction of the arrow 33 causing toxic blood to flow through the blood channel 34. The filtrate containing toxic metabolites and water passes through the polyamide membrane 35 which lies on a support 36 having a profiled structure forming a channel 37 for discharging the filtrate to the filtrate conduit 38. Pumping filtrate through the membrane 35 may be accomplished by means of a suction pump 44 which is attached to the channel 37, additionally or instead of the blood pump 32. The detoxified blood is conducted through an outlet port 39 of the hemofiltration apparatus 30 which is connected to flexible tubing 40, and through a bubble trap 41 which removes any gases which may be trapped in the system to the patient's venous access. About 90 weight percent of the water which is discharged in the filtrate are restored by tubing 42 and infusion pump 43 to the flexible tubing 40.

For reasons of clarity a single blood channel only of the hemofiltration apparatus is shown.

What is claimed is:

1. A permselective asymmetric membrane suitable for hemofiltration, comprised of polyamide and having a heteroporous structure, comprising a polyamide which comprises a plurality of repeating terephthaloyldiamine units of the formula:

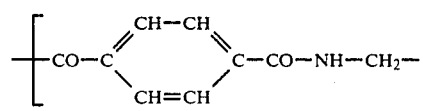

-continued

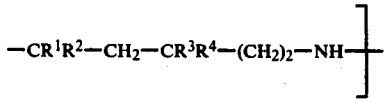

wherein $R^1$ represents hydrogen and $R^2$, $R^3$, and $R^4$ represent lower alkyl, or $R^3$ represents hydrogen and $R^1$, $R^2$, and $R^4$ represent lower alkyl, having an ultrafiltration-capacity of from about $1.5 \cdot 10^{-3}$ to about $15 \cdot 10^{-3}$ cm/s·bar, determined for water at 0.1 bar and 20° C., a thickness of not more than about 100 microns, and a molecular weight exclusion limit of from about 20,000 to about 70,000 Dalton.

2. The membrane as defined in claim 1, wherein the lower alkyl is methyl or ethyl.

3. A membrane as defined in claim 1, wherein the polyamide is a polycondensate or terephthalic acid and a mixture of isomeric diamines of the formula:

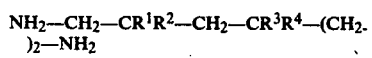

wherein $R^1$, $R^2$, $R^3$, and $R^4$ are as defined in claim 1.

4. The membrane as defined in claim 3, wherein the polyamide is a polycondensate of terephthalic acid and a mixture of about equal parts of 2,2,4-trimethyl-hexamethylenediamine and 2,4,4-trimethyl-hexamethylenediamine.

5. The membrane as defined in claim 1, having an ultrafiltration-capacity for blood at 0.1 bar of at least one-sixth of its ultrafiltration-capacity for water.

6. The membrane as defined in claim 1, which is in the form of a flat sheet or a tube.

7. The membrane as defined in claim 6, which in the dry and in the wet state exhibits an elongation at break ranging from about 60 to about 120%, a resistance-to-tear-propagation ranging from about 20 to about 50 N/mm, and a bursting-pressure ranging from about 0.18 to about 0.52 bar.

8. In a method for performing hemofiltration, the step of contacting blood under a pressure gradient with an asymmetric permselective membrane, wherein the improvement comprises said membrane comprising the polyamide-membrane as defined in claim 1.

9. In an apparatus for performing hemofiltration including a hemofiltration-membrane, means for transporting blood into contact with a first side of said membrane and means for withdrawing metabolites from a second side of said membrane, wherein the improvement comprising said hemofiltration-membrane comprising the polyamide-membrane as defined in claim 1.

* * * * *